United States Patent [19]

Johnson

[11] 4,084,908
[45] Apr. 18, 1978

[54] REPETITIVE OUTPUT LASER SYSTEM AND METHOD USING TARGET REFLECTIVITY

[75] Inventor: Roy R. Johnson, Ann Arbor, Mich.

[73] Assignee: KMS Fusion, Inc., Ann Arbor, Mich.

[21] Appl. No.: 630,616

[22] Filed: Nov. 10, 1975

[51] Int. Cl.² .......................... G02F 1/09; G01B 1/00; H01S 3/00

[52] U.S. Cl. ........................................ 350/151; 176/1; 330/4.3; 331/DIG. 1; 350/147

[58] Field of Search ............................... 350/147, 151; 331/DIG. 1, 94.5 C; 176/1; 219/121 LM; 356/106 LR; 330/4.3

[56] References Cited

U.S. PATENT DOCUMENTS 3,778,585 12/1973 Mallozzi et al. ............... 331/DIG. 1

OTHER PUBLICATIONS

Brueckner et al., "Double Pass Amplifiers", *Applied Optics* 10-1974, pp. 2183–2185.

Primary Examiner—John K. Corbin
Assistant Examiner—Wm. H. Punter
Attorney, Agent, or Firm—Barnes, Kisselle, Raisch & Choate

[57] ABSTRACT

An improved laser system and method for implosion of a thermonuclear fuel pellet in which that portion of a laser pulse reflected by the target pellet is utilized in the laser system to initiate a succeeding target implosion, and in which the energy stored in the laser system to amplify the initial laser pulse, but not completely absorbed thereby, is used to amplify succeeding laser pulses initiated by target reflection.

12 Claims, 2 Drawing Figures

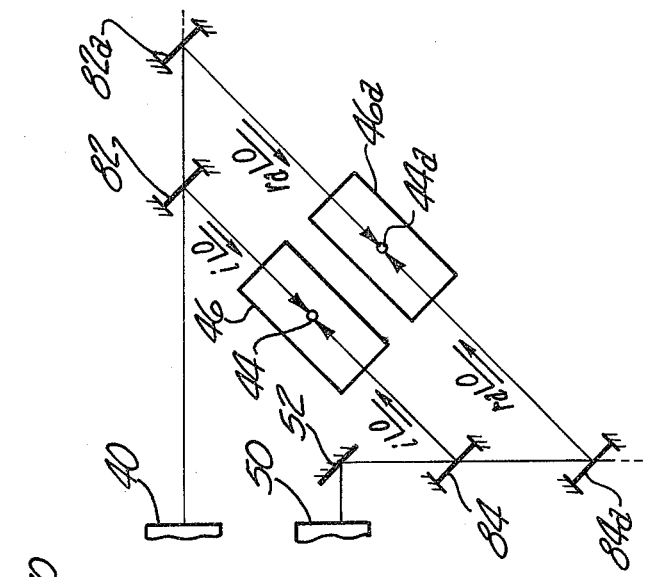
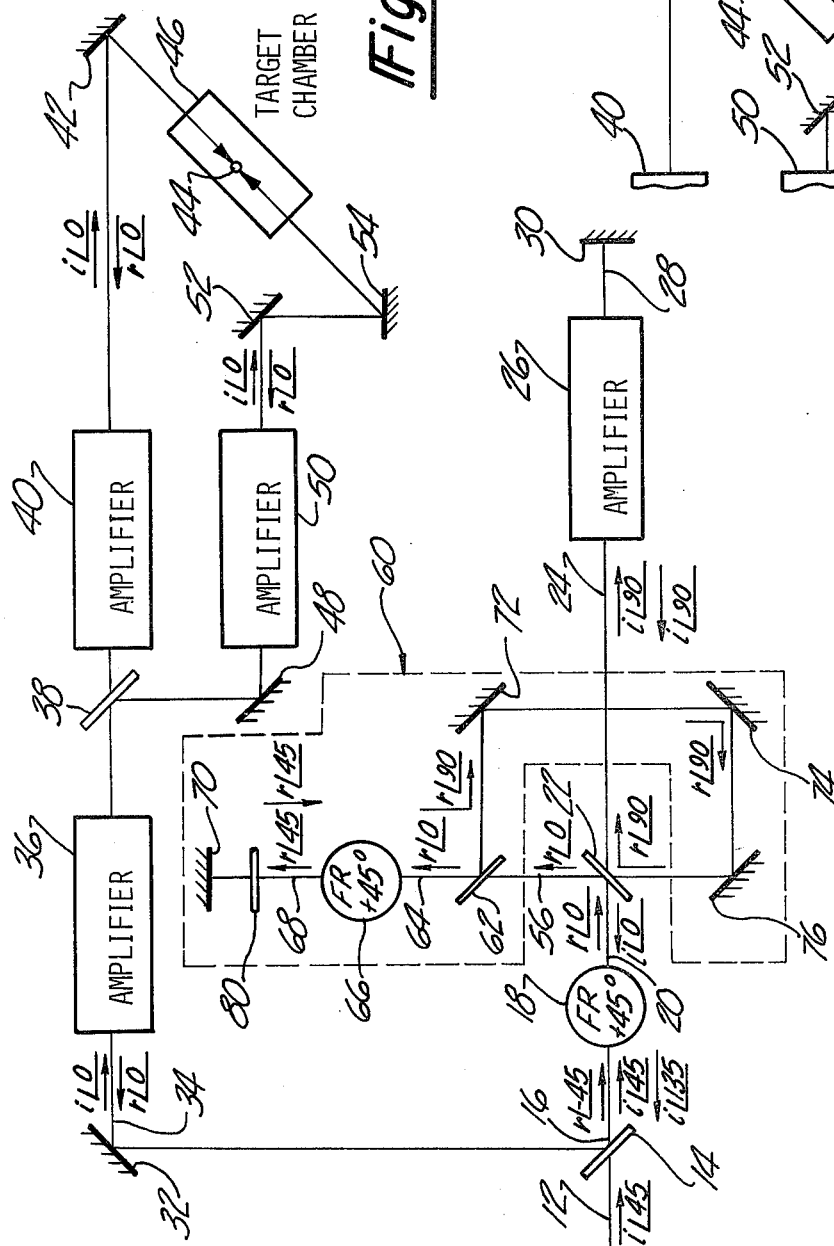
Fig-1
Fig-2

REPETITIVE OUTPUT LASER SYSTEM AND METHOD USING TARGET REFLECTIVITY

This invention relates to light amplifier systems and, more particularly, to a pulsed laser system and method for repetitively illuminating a reflective target.

Pulsed lasers are presently used for illuminating a thermonuclear fuel pellet in laser-driven fusion reaction systems. Such reaction systems are shown, for example, in the following U.S. Pat. Nos.:

3,378,446; Apr. 16, 1968, Whittlesey; 3,489,645; Jan. 13, 1970, Daiber; 3,624,239; Nov. 30, 1971, Fraas; 3,762,992; Oct. 2, 1973, Hedstrom.

The subject of laser-driven fusion reactors is also discussed in detail in J. L. Emmet et al., "Fusion Power by Laser Implosion", Scientific American, Vol. 230, No. 6, June 1974, pgs. 24-37 and in Tubin et al, "Fusion by Laser", Scientific American, Vol. 224, No. 6, June 1971, pgs. 21-33.

In reactor systems of this type the thermonuclear fuel pellet, which may be of deuterium-tritium for example, reflects a large percentage of the pulsed laser energy incident thereon, sometimes as much as 50 to 80%. This energy is, for the most part, reflected back into the driving laser system. To protect the laser system, and particularly the laser amplifiers, from overloading as a result of this target-reflected energy, Faraday rotators and polarizers are suitably placed in the laser beam path to rotate and reject the reflected energy. Hence, this reflected energy, heretofore usually deemed to be useless and undesirable, is eventually wasted.

Furthermore, the laser pulse incident upon the pellet, which may be on the order of 250 picoseconds in duration, uses or absorbs only about 1 to 5% of the energy stored in the laser system amplifiers in which flash lamps used to excite amplifier components may be energized for up to 300 microseconds. The energy stored in the amplifiers after passage therethrough of the initial laser pulse, which energy may be on the order of several megajoules, is eventually wasted.

It is a general object of the present invention to provide an improved and more efficient pulsed laser system and method. More specifically, it is an object of the present invention to provide a pulsed laser system and method in which both the energy reflected by the laser target and the energy stored in the laser amplifiers are used to initiate and amplify succeeding laser pulses.

The novel features which are considered to be characteristic of the present invention are set forth in particular in the appended claims. The invention itself, however, together with additional objects, features and advantages thereof, will be best understood from the following description when read in conjunction with the accompanying drawings in which:

FIG. 1 is a schematic diagram of a laser-powered fusion system illustrating an embodiment of the present invention; and FIG. 2 is a schematic diagram of a modification to the target portion of the system of FIG. 1.

In the drawings several polarizers, rotators and mirrors, etc. are shown and may be of any suitable conventional type which will funtion as hereinafter described. These components are shown as being schematically connected to each other and to other system components along a laser beam path. It will be understood that an incident pulse traveling on this beam path, i.e., the initial pulse incident upon the laser target, and/or the reflective pulses, i.e., pulses created by reflection from the target, may travel any particular segment of the illustrated beam path in one or both directions during successive target illumination sequences. Immediately adjacent selected segments of the beam or pulse path of FIG. 1 are annotations indicating direction of travel and angle of polarization of a pulse (designated $i$) initially incident upon the target and a pulse (designated $r$) which is brought into being as a result of target reflection of a portion of the initial pulse. It will be understood, of course, that the several pulses indicated as being associated with each path segment do not appear on that segment coincidentally.

Referring to FIG. 1, a pulse source 10, which may be a mode-locked laser together with suitable filter and polarizers for example, supplies on beam path segment 12 a laser pulse of selected shape and duration at a polarization angle of 45°. It will be understood, of course, that this and all other polarization angles to be discussed hereinafter are taken with reference to an arbitrary reference angle. In this case the 0° reference angle is taken to be horizontal polarization, which is also the polarization of the final pulse which will illuminate (and be reflected from) the target. The pulse on segment 12 is incident upon a polarizer 14 which is oriented to pass onto a path segment 16 a light beam or pulse having a 45° polarization angle. The initial pulse, still at an angle of 45°, is then incident upon a conventional Faraday rotator 18 which rotates the angle of polarization of a pulse passing therethrough by an amount equal to 45°. Hence, the initial pulse on path segment 20 at the output of rotator 18 is now at a polarization angle of 90°. The pulse is then incident on a polarizer 22 which is oriented to pass light having a polarization angle of 90° onto a path segment 24 to a conventional laser amplifier 26. Amplifier 26 may comprise one or more neodymium glass disk amplifiers including the usual flash lamps.

The initial pulse is amplified at 26, passed onto a path segment 28 at the output of amplifier 26, reflected by a mirror 30 back onto segment 28 and again into amplifier 26. The twice-amplified initial pulse then appears on segment 24, is passed through polarizer 22 since it still has a polarization angle of 90°, and is fed to rotator 18. Since rotator 18 is of the Faraday type, the angle of polarization of the pulse is rotated an additional 45°, placing the initial pulse onto path segment 16 at a polarization angle of 135°. The pulse is then reflected by polarizer 14 onto a mirror 32, and thence onto a beam path segment 34. However, mirror 32 is oriented in three-dimensional space with respect to polarizer 14 such that the pulse on path 34 is rotated an additional 45° with respect to the polarization angle at path 16, whereby the initial pulse now has a 180° polarization angle, which is the same as 0° or horizontal polarization. Mirror 32 may, of course, comprise several mirrors where convenient, the total shift in polarization being equal to 45° as described.

The initial target pulse is then fed through an amplifier 36 onto a 50/50 beamsplitter 38. One-half of the pulse energy is fed through an amplifier 40 onto a mirror 42 from whence it is reflected onto a suitably placed target pellet 44 within a target chamber 46. The second half of the pulse split by beamsplitter 38 is reflected by a mirror 48 through an amplifier 50 onto mirrors 52, 54 and then onto target 44. Amplifiers 36, 40 and 50 may comprise conventional disk amplifiers, for example, and may each have an aperture in the order of 10 centimeters. Target chamber 46 will normally include an arrangement of suitable lenses and mirrors to uniformly focus about the surface of target 44 the beams reflected by mirrors 42, 54. Such an arrangement is shown, for example, in the U.S. application of C. E. Thomas, Ser. No. 365,092, filed May 21, 1973 and assigned to the assignee hereof.

A portion of the incident pulse energy is absorbed by target 44, while the remainder of the pulse energy is reflected by the target out of the target chamber and back along the incident beam path through amplifiers 40, 50, beamsplitter 38 and amplifier 36. The major component of the target-reflected or reflective pulse incident upon mirror 32 is at a polarization angle of 0°. Between mirror 32 and polarizer 14, the polarization angle of the reflective pulse is reduced by 45° such that the pulse is reflected by polarizer 14 onto path segment 16 at a polarization angle of −45° (which is the same as the 135° angle of polarization of the initial target pulse when it last appeared on path segment 16). Rotator 18 returns the polarization angle of the reflective pulse to zero such that the pulse is reflected by polarizer 22 onto a path segment 56 at horizontal polarization.

The laser system thus far described in connection with FIG. 1 is generally in accordance with prior art techniques in which the pulsed-energy on path segment 56 which, generally speaking, originated as a reflection from target 44 and which was amplified by amplifiers 36, 40 and 50, is dissipated or otherwise wasted. Furthermore, the total energy stored in amplifiers 26, 36, 40 and 50 is only slightly dissipated by the initial target-illumination and target-reflection pulses. Where the neodymium-glass disks in the several amplifiers ae excited by a 300 microsecond pulse from the associated pumping lamps as in the example described above, the 250 picosecond laser pulse is usually placed toward the end of this energized window, say after 275 microseconds of pumping time. The remaining energy stored in the amplifier disks, which may be as much as 99% of the total stored energy, and the remaining 25 microseconds within the energized window are both wasted. In a laser-driven implosion system, the energy thus wasted may be on the order of several megajoules. A major goal of laser-driven fusion research at the present time is to achieve the "break-even point" at which the fusion energy generated by the target is equal to the electrical input energy to the laser system. Achievement of this goal is not facilitated where several megajoules of input energy is wasted. In accordance with the present invention the target-reflected pulse on path segment 56 is fed to an optical circuit 60 which suitably rotates and, if required, attenuates the reflective pulse, and which then routes the pulse back onto the main beam path to initiate another target-illumination pulse identical to the first.

The pulse on path segment 56 is fed within circuit 60 to a polarizer 62 which passes the horizontally polarized reflective pulse onto path segment 64 to a Faraday rotator 66. Rotator 66 rotates the angle of polarization of the reflective pulse 45° and then feeds the same via a path segment 68 to a mirror 70. The pulse, now at a polarization angle of 45°, is then reflected back through rotator 66, where an additional rotation of 45° takes place, onto polarizer 62 via segment 64. The target-reflected pulse, now at a polarization angle of 90°, is then reflected by polarizer 62 via the mirrors 72, 74 and 76 onto polarizer 22, whence it is reflected onto path segment 24, still at a polarization angle of 90°. Hence, the reflective pulse now has the same polarization angle as did the initial pulse when it traveled on path segment 24 toward amplifier 26, and may follow the path of the initial pulse through amplifier 26 onto mirror 30, etc., until eventually striking target 44.

To insure that the various amplifiers are not overloaded and that the reflective pulse which eventually illuminates target 44 has an intensity equal to that of the initial target pulse, an attenuator may be required in circuit 60. Such an attenuator 80 is shown in path segment 66 and must attenuate the reflected pulse passing twice therethrough to the extent required to make the intensity thereof equal to that of the initial pulse when it traveled toward amplifier 26 on path segment 24. The degree of attenuation provided by attenuator 80 must, of course, be empirically or experimentally selected for a selected system application taking into account the reflectivity of target 44, the gain of amplifiers 36, 40 and 50, and the desired target pulse intensity.

As presently contemplated, the total time between initial and reflective pulses illuminating target 44 will be on the order of 70 to 100 nanoseconds, which time is, of course, a function of the pulse path length and the delay provided by the various amplifiers, etc. Ten such reflective illuminating pulses would use only 1 microsecond of the remaining 25 microseconds in the amplifier energization window, but would deplete the energy stored in the amplifiers to such an extent that the intensity of target-reflected pulses at circuit 60 would no longer be constant. Where a constant attenuator is used at 80, the process of reinitiating illuminating pulses from target reflection would preferably stop at this point. However, where the characteristics of attenuator 80 are such that the attenuation factor thereof decreases with the intensity of the beam incident thereon, the reinitiation process may continue until there is insufficient energy in the overall system to cause implosion of target 44.

Target 44 may be any one of a number of target types adapted to accommodate and use multiple successive illuminating pulses. For example, means may be provided within chamber 46 to position a new target in the beam path before each illuminating pulse, in the system as described every 100 nanoseconds. Alternatively, target 44 may be of the type in which only part of the fuel is burned by each laser shot, the target or the beam focusing means within chamber 46 being incrementally stepped after each shot to illuminate a new portion of the target on the next-succeeding pulse. On the other hand, multiple targets and target chambers may be used as depicted in FIG. 2, the originally incident and successive reflective pulses illuminating a selected target in a selected target chamber.

In the modification depicted in FIG. 2 mirrors of 42, 54 of FIG. 1 are replaced by two series of bifurcated plasma mirrors 82, 82a, etc. and 84, 84a, etc. respectively. Such mirrors reflect the first two pulses incident thereon, from the system and target respectively, but are transparent to further pulses of the series for a selected time period. Mirrors 82, 84 are constructed such that the first reflecting surface thereof is "removed" (by excitation of the associated plasma) after the incident laser pulse passes onto the target, and the reflecting surface is "removed" after the reflected laser pulse passes back into the laser system. The subsequent laser beams are then handled by mirrors 82a, 84a, etc. for the remaining number of targets and chambers. See Mallozzi et al., "A Multi-Kilojoule Short-Pulse Glass Laser and its Use in High-Temperature Plasma Heating", Plasma Physics and Controlled Nuclear Fusion Research, (Proc-Int. Conf., Tokyo, Japan, 1974) 1 AEA, Vienna, Austria, 1975. Thus, in the modification of FIG. 2 the initial pulse (i) is reflected by mirrors 82, 84 onto target 44 as in FIG. 1. Successive illuminating pulses $r_a$, $r_b$, etc. generated as described by target reflectivity are reflected by mirror combination 82a-84a, 82b-84b, onto successive targets 44a, 44b, etc. In the example discussed above wherein 10 reflective illuminating pulses are generated, a total of 11 targets may be successively illuminated. Although the reflective illuminating pulse must travel a longer beam path for each succeeding chamber, this additional time is easily accommodated within the remainder of the 25 microsecond amplifier energization window.

From the foregoing description it will now be apparent that there has been provided in accordance with the present invention a repetitive output laser system using target reflectivity which fully satisfies all of the objects, aims and advantages set forth above. Furthermore, while the invention has been discussed with reference to a fusion reactor system in which a thermonuclear fuel pellet is imploded by a pulsed laser system, it will be apparent that the invention described would be useful in connection with other pulsed laser systems in which multiple successive pulses are to be supplied and in which the target has at least some degree of reflectivity. For example, the present invention may be used in a pulsed laser system for cutting metal, such as steel. Moreover, it will be equally apparent that many alternatives, modifications and/or variations in the optical circuit 60 (FIG. 1) will suggest themselves to persons skilled in the art in view of the foregoing description. Accordingly, the invention is intended to embrace all such alternatives, modifications and variations as fall within the spirit and broad scope of the appended claims.

The invention claimed is:

1. In the method of providing successive target illumination pulses in a pulsed laser system in which a significant portion of the laser energy incident upon a target is reflected thereby back into said system, and in which said reflected energy is diverted from said system by rotating the angle of polarization of said energy and then diverting said reflected energy at said rotated angle of polarization out of said system, the improvement comprising the steps of rotating said angle of polarization of said diverted energy to be equal to that of said incident energy at a selected point in said system, attenuating said diverted energy to be equal to the energy of said incident energy at said selected point in said system, and redirecting said rotated and attenuated energy to said selected point in said system, whereby successive target illumination pulses are directed onto a target as a result of target reflectivity.

2. In a pulsed laser target illumination system in which a portion of the energy of an incident pulse illuminating a target is reflected back into said system along the illuminating pulse path, said reflected pulse having substantially the same angle of polarization as does said incident pulse, said system including means rotating said angle of polarization of said reflected pulse and means at a selected point in said pulse path diverting said rotated reflected pulse, the improvement comprising means rotating said angle of polarization of said diverted pulse to be equal to the angle of polarization of said incident pulse at said selected point, means attenuating said diverted pulse to the intensity of said incident pulse at said selected point, and means oriented and disposed to route said diverted, rotated and attenuated pulse back onto said pulse path at said selected point, said reflected pulse generating a target illuminating pulse subsequently to said incident pulse.

3. The method of repetitively pulsing a pulsed laser target illumination system in which a portion of the pulse energy illuminating a target is reflected back into said system at an angle of polarization substantially equal to that of said illuminating pulse, said method comprising the steps of rotating the angle of polarization of said reflected pulse as compared to the angle of polarization of said illuminating pulse at a selected point in the pulse path of said system, diverting said reflected and rotated pulse from said pulse path, varying the angle of polarization of said diverted pulse until equal to the angle of polarization of said illuminating pulse at said selected point in said pulse path, varying the intensity of said diverted pulse until equal to the intensity of said illuminating pulse at said selected point, and redirecting said diverted pulse having said varied intensity and angle of polarization back onto said pulse path at said selected point.

4. In a pulsed laser system which includes laser amplifiers operatively connected on a pulse path to develop a pulsed laser signal, means directing said signal onto a target and means in said pulse path polarizing said pulse signal to a predetermined polarization angle, a portion of said pulsed signal directed onto said target being reflected by said target at said predetermined polarization angle back into said laser system along said pulse path, the combination comprising first means in said pulse path rotating said angle of polarization of said reflected pulse to an angle of 90° displaced from that of said pulsed signal at a preselected point in said pulse path, polarizer means disposed in said pulse path at said preselected point to deflect said rotated reflected pulse, second means rotating said deflected pulse to said angle of polarization of said pulsed signal at said preselected point, means varying the intensity of said deflected pulse to be equal to the intensity of said pulsed signal at said preselected point, and means reinserting said deflected pulse having varied intensity and angle of polarization into said pulse path at said preselected point, whereby a second pulsed signal is developed in said pulsed laser system and directed into a target.

5. The combination set forth in claim 4 wherein said second rotating means comprises a polarizer disposed with respect to said polarizer means to intercept said deflected pulse and a rotator disposed with respect to said polarizer to rotate said angle of polarization of said deflected pulse 90°, said reinserting means being disposed and oriented with respect to said rotator to direct said twice-rotated pulse back onto said polarizer means, said polarizer being oriented to be transparent to one of said deflected pulse and said twice-rotated pulse and reflecting the other of said deflected pulse and said twice-rotated pulse.

6. The combination set forth in claim 5 wherein said rotator comprises a Faraday rotator disposed to receive said deflected pulse from said polarizer, a mirror disposed with respect to said Faraday rotator to receive a pulse directed therethrough by said polarizer and to direct said received pulse back through said Faraday rotator onto said polarizer, said Faraday rotator rotating the angle of polarization of said pulse 45° on each pass therethrough.

7. The combination set forth in claim 6 wherein said intensity varying means comprises intensity attenuating means disposed between said polarizer and said mirror to reduce the intensity of said reflected pulse as said pulse is twice passed through said rotator.

8. In a pulsed laser target illumination system in which a portion of the energy of a pulse illuminating a target is reflected back into said system along the illuminating pulse path, said system including first means rotating the angle of polarization of said reflected pulse as compared to that of said illuminating pulse on said path and first polarizer means to divert said reflected pulse having said rotated angle of polarization, the improvement comprising means intercepting said diverted pulse, means varying said angle of polarization of said intercepted diverted pulse to be equal to said angle of polarization of said illuminating pulse at a selected point in said pulse path, and means reinserting said diverted pulse having said varied angle of polarization onto said pulse path at said selected point.

9. The improvement set forth in claim 8 wherein said intercepting means comprises second polarizer means oriented to intercept and pass said diverted pulse at said rotated angle of polarization; and wherein said varying means comprises second means disposed to intercept said diverted pulse passed by said second polarizer means and to rotate said angle of polarization of said reflected pulse 90°, and means routing said pulse from said second rotating means back onto said second polarizer means.

10. The improvement set forth in claim 9 wherein said reinserting means comprises means disposed to intercept pulses reflected by said second polarizer means and to divert said pulses back onto said first polarizer means.

11. The improvement set forth in claim 8 further comprising means disposed to attenuate said diverted pulse such that said diverted pulse, when reinserted at said selected point, has an intensity equal to the intensity of said illuminating pulse at said selected point.

12. The combination comprising a pulsed laser system and a target which reflects a significant portion of the pulsed energy incident thereon from said system, said system comprising a first rotator disposed in the beam path of said system to rotate the angle of polarization of said target-reflected energy to an angle of 90° with respect to the angle of polarization of said incident pulsed energy, a first polarizer disposed at the output of said first rotator and oriented to deflect from said beam path energy reflected by said target and rotated by said first rotator, a second polarizer disposed to intercept said energy deflected by said first polarizer, a second rotator disposed with respect to said second polarizer to intercept said deflected energy and to rotate the angle of polarization thereof a second time by an angle of 90°, means disposed and oriented with respect to said second rotator to direct said deflected energy back onto said second polarizer after said deflected energy has been twice-rotated, said second polarizer being oriented to pass one of said deflected energy and said twice-rotated energy and to reflect the other of said deflected energy and said twice-rotated energy, means attenuating said deflected energy to an intensity substantially equal to that of said incident energy at said first polarizer, and means disposed with respect to said second polarizer to intercept said twice-rotated energy and oriented to redirect said energy onto said first polarizer from a direction such that said attenuated and twice-rotated energy is passed through said system and is incident upon a target.

* * * * *